United States Patent [19]

Wright

[11] Patent Number: 5,200,451

[45] Date of Patent: Apr. 6, 1993

[54] 1,3-DIPHENOXY-2-PROPANOL AS HEAT STABILIZER AND COMPOSITIONS STABILIZED THEREWITH

[75] Inventor: William G. Wright, Anna Maria, Fla.

[73] Assignee: Wrightline Chemical Corporation, Anna Maria, Fla.

[21] Appl. No.: 846,591

[22] Filed: Mar. 5, 1992

[51] Int. Cl.⁵ .................................................. C08L 5/06
[52] U.S. Cl. ..................................... 524/372; 523/456; 523/510
[58] Field of Search ................. 524/372; 523/456, 510; 428/349; 568/644; 252/407

[56] References Cited

U.S. PATENT DOCUMENTS

| | | | |
|---|---|---|---|
| 2,329,033 | 9/1942 | Britton et al. | 524/372 |
| 2,967,774 | 1/1961 | Bell et al. | 568/644 |
| 3,056,762 | 10/1962 | Tringall | 528/98 |
| 3,118,953 | 1/1964 | Catukovic | 568/644 |
| 3,888,671 | 6/1975 | Muzyczko et al. | 430/302 |
| 3,969,119 | 7/1976 | Muzyczko et al. | 522/65 |
| 4,131,572 | 12/1978 | Brendley | 524/41 |
| 4,310,707 | 1/1982 | Strege | 568/648 |
| 4,310,708 | 1/1982 | Strege et al. | 568/648 |
| 4,341,905 | 7/1982 | Strege | 568/584 |
| 4,586,408 | 4/1986 | Wang et al. | 568/644 |

FOREIGN PATENT DOCUMENTS 1028130 4/1958 Fed. Rep. of Germany .
57-08240 1/1982 Japan .

OTHER PUBLICATIONS

CA 96: 200771w (1982).
CA 54: 14187G (1958).

Primary Examiner—Veronica P. Hoke
Attorney, Agent, or Firm—Martin K. Lindemann

[57] ABSTRACT

An improved polymeric compositions containing 1,3-diphenoxy-2-propanol as a heat stabilization agent and antioxidant is provided. This invention relates to polymeric compositions containing 1,3-diphenoxy-2-propanol as a heat stabilization agent, and antioxidant, and, optionally, as flow control agent; more particularly, this stabilizer is especially suited to protect polymeric coatings- and adhesive which are heated and flow, such as hot melt coating- and adhesive compositions.

8 Claims, No Drawings

1,3-DIPHENOXY-2-PROPANOL AS HEAT STABILIZER AND COMPOSITIONS STABILIZED THEREWITH

FIELD OF THE INVENTION

This invention relates to polymeric compositions containing 1,3-diphenoxy-2-propanol as an antioxidant and heat stabilization agent, and, optionally, as flow control agent; more particularly, this stabilizer is especially suited to protect polymeric coatings- and adhesives which are heated and flow, such as hot melt coating- and adhesive compositions.

BACKGROUND OF THE INVENTION

All polymers, natural and synthetic, degrade under conditions of heat with progressive loss in mechanical strength. At the same time a noticeable discoloring effect is usually observed as the degradation process proceeds, thereby affecting the aesthetic appearance of the coating, as well as its mechanical properties. For many polymer applications degradation must be inhibited by stabilizers to assure the required life expectancy. The aging under the influence of the application temperature as well as under the influences of normal use conditions causes a change of the polymer structure which can be prevented, or at least retarded, by the addition of a protective chemical substance, also known as stabilizer. It is thought that many changes in the polymer structure which lead to the deterioration of appearance and physical properties are caused by the reaction of the polymer with the oxygen of the air, therefore this process is also called air oxidation. There are many known heat stabilizers for polymeric systems. For example, aromatic amines and substituted phenols with a free hydroxyl group inhibit the thermal oxidation of natural rubber. Alkylated phenols with a free hydroxyl group are useful to thermally stabilize hydrocarbon polymers. A general treatment of the theory and practice of polymer stabilization can be found in the book "Polymer Stabilization" edited by W. Lincoln Hawkins, published by Wiley-Interscience, New York 1972. Chapter 2 in said book is treating the stabilization of polymers against thermal oxidation specifically. Unfortunately, commercial heat stabilizers are very expensive and the need for a cheaper stabilizer has been a long felt need in the art.

THE PRESENT INVENTION

The present invention relates to the surprizing discovery that 1,3-diphenoxy-2-propanol, which has long been used as a flow modifier for polymeric systems, which are subject to heating, being during processing or during use, also functions as a thermal stabilizing agent and antioxidant for polymeric compositions. 1,3-Diphenoxy-2-propanol is especially suited as a stabilizer for hot melt coating- and adhesive compositions.

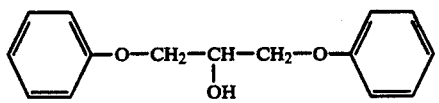

1,3-Diphenoxy-2-propanol 1,3-Diphenoxy-2-propanol, melting point: 88°–90° C., appearance: white powder, is a well known chemical compound. The synthesis of 1,3-diphenoxy-2-propanol has been described in U.S. Pat. No. 3,969,119 to Muzyczko et al. It is produced by the reaction of phenyl glycidyl ether and phenol; phenyl glycidyl ether is made by the reaction of phenol with epichlorohydrin under alkaline conditions. Several uses for 1,3-diphenoxy-2-propanol have been suggested; for example, in U.S. Pat. No. 3,888,671 to Muzyczko et al. it is proposed to use 1,3-diphenoxy-2-propanol as a photoinitiator for both saturated and unsaturated resins including resins that are not photosensitive in themselves. Presently, as mentioned above, 1,3-diphenoxy-2-propanol is used as a flow modifier for polymer melt systems, such as hot melt coatings- and adhesives. Japanese Patent Specification No. 82 08,240, (referenced in Chemical Abstracts, Vol 96 (1982), Abstract No.: 200,771) assigned to the Unitika Co. covers the use of 1,3-diphenoxy-2-propanol as a flow modifier for polyester resins.

Although the hydroxy group in 1,3-diphenoxy-2-propanol is not attached to the phenolic ring, as is the case with heretofore known phenolic heat stabilizers, but rather is removed from the phenolic ring of the molecule by two carbons, it has been surprizingly found that 1,3-diphenoxy-2-propanol is a good thermal stabilizer for polymeric binders in hot-melt coating- and adhesive compositions. 1,3-Diphenoxy-2-propanol is commercially available from GCA Chemical Corp. in Stamford, CT, and offered under the name GCA #44-44. It is apparent that 1,3-diphenoxy-2-propanol, being made from the low cost raw materials phenol and epichlorohydrin is much less expensive than, for example, the commercially available heat stabilizer "Irganox 10-10", sold by the Ciba-Geigy Corp., which is chemically identified as: tetrakis-[methylene-3(3′,5′-di-t-butyl-4-hydroxyphenyl) propionate] methane (CAS #6683-19-8). The amount of 1,3-diphenoxy-2-propanol normally added to the polymeric formulation as a heat stabilizer is from 0.1 to 5%, preferably from 0.4 to 4%, more preferably from 0.6 to 3%. When used simultaneously as flow control agent the optimum amount of 1,3-diphenoxy-2-propanol to be used is from 0.1 to 5%, preferably from 2 to 4% based on the weight of polymer to be protected.

Suitable polymers, which can be stabilized for use in hot melt coating- and adhesive compositions referred to above are: epoxy resins; epoxy-polyester resin mixtures; polyurethanes; polyurethane-polyester resin mixtures; acrylic-urethane copolymers; vinyl chloride thermosetting copolymers, as described in U.S. Pat. No. 4,093,575, such as vinyl chloride/vinyl acetate/2-hydroxypropyl acrylate; vinyl chloride/2-hydroxypropyl acrylate; vinyl chloride/vinyl acetate/2-hydroxyethyl acrylate; vinyl chloride/vinyl acetate/2-hydroxybutyl acrylate, vinyl chloride/vinyl acetate/vinylidene chloride/vinyl alcohol; vinyl chloride/vinyl alcohol, and the like. Acrylate polymers and copolymers, such as methyl methacrylate/ styrene/2-hydroxypropyl acrylate, and the like; polyamides; silicone resins; hydroxy functional silicone resins; amine functional silicone resins; polyesters; silicone modified polyesters; fluorinated polymers and copolymers, such as polyvinyl fluoride and copolymers; polyvinylidene fluoride and copolymers; tetrafluoroethylene polymers and copolymers; ethylene-chlorotrifluoroethylene copolymers; polyolefins, such as polyethylene, polypropylene, polybutylene and polyisobutylene; ethylene-vinyl acetate copolymers. Often mixtures of any of these polymers may be useful in the instant invention to obtain special properties and effects.

Auxiliary hardening- or curing agents, which can optionally be added to the hot melt coating- and adhesive compositions, include: resins containing the functional group —NCH$_2$CH$_2$OH, and/or —NCH$_2$OH, such as melamine-formaldehyde resins; urea-formaldehyde resins and the like; also alkylated melamine-formaldehyde resins; also blocked isocyanates, such as blocked isophorone diisocyanate (IPDI) and the like; also triglycidyl isocyanurate; glycidyl methacrylate; dicarboxyl acid anhydrides, such as maleic acid anhydride; succinic acid anhydride; itaconic acid anhydride; glutaric acid anhydride; phthalic acid anhydride, trimellitic acid anhydride, and the like. Also useful are the dianhydrides of tetracarboxylic acids, such as the dianhydrides of 1,2,4,5-benzenetetracarboxylic acid, 1,2,3,4-butanetetracarboxylic acid, and the like.

Fillers, pigments and dyes may be added to the hot melt coating- and adhesive compositions to obtain special mechanical or chemical properties, as well as for coloring of the coatings. Illustrative of such materials are: clays, calcium carbonate, silica, titanium dioxide, aluminum trihydrate, magnesium trihydrate, antimony oxide, barium sulfate, lead silica chromate, black iron oxide, chromium green and the like. Metallic pigments, such as zinc powder, aluminum flakes and the like are often added to the hot melt coating- and adhesive compositions to give the coating a metallic appearance. For color effects colored pigments, such as toluidine red, phthalocyanine blue, phthalocyanine green, quindo red, carbon black and the like is often added to the polymer melt formulation. Dyes may also be added for this purpose. Fillers, pigments and dyes are employed in the amount, by weight of the dry polymer melt formulation, of from 0 to 55 parts. Mixtures of these fillers, pigments and dyes may also be used. When clear, glossy coatings or castings are desired, dyes, fillers, or pigments are omitted from the formulation.

In order to facilitate the melting and fluxing of the polymer mix upon heating, flow control agents are often added to the polymer melt formulation. These lower the melt flow viscosity and allow melting of the polymer melt formulation at lower temperatures. They may be low molecular weight polymers, having a molecular weight of 1000 to 30000. Illustrative of such low molecular weight polymers are acrylic polymers and copolymers. Examples of these are described in U.S. Pat. No. 4,131,572, such as copolymers of acrylic or methacrylic esters of lower aliphatic alcohols with acrylic or methacrylic esters of bicyclic alcohols such as isobornyl alcohol; also used are: polylauryl acrylate, polybutyl acrylate, poly(2-ethyl hexyl) acrylate, and the like. These low molecular weight polymers may also contain functional groups such as recited above, in order that they may be fully incorporated into hot melt coating- and adhesive compositions upon heating and curing of the formulation. An especially useful flow modifier is 1,3-diphenoxy-2-propanol, which is used widely in the industry because of its low cost. The particular flow control agents to be employed are selected keeping in mind their compatibility with the particular polymer system which is used in hot melt coating- and adhesive compositions.

For added flexibility of the polymer coating, hot melt coating-and adhesive compositions may optionally contain an external plasticizer. Suitable plasticizers for the powder coating include benzyl butyl phthalate; dibutyl phthalate; 2-ethyl hexyl benzyl phthalate; triphenyl phosphate; dicyclohexyl phthalate; diallyl phthalate; neopentyl glycol dibenzoate; dibenzyl phthalate; butyl cyclohexyl phthalate; mixed benzoic acid and fatty oil acid esters of pentaerythritol; poly(propylene adipate) dibenzoate; diethylene glycol dibenzoate; tetrabutylthiodisuccinate; butyl phthalyl butyl glycolate; acetyl tributyl citrate; dibenzyl sebacate; tricresyl phosphate; toluene ethyl sulfonamide; and the di 2-ethylhexyl ester of hexamethylene diphthalate and the like. Solid plasticizers are particularly useful in hot melt coating- and adhesive compositions since they can be dry blended easily with the polymer. Mixtures of plasticizers may also be useful to obtain special properties. The particular plasticizer or plasticizers, and the amount thereof are chosen depending upon the final application properties desired, as well as in accordance with the demand for compatibility with a particular polymer system.

The hot melt coating- and adhesive compositions are prepared by extruding the physical mixture of above mentioned ingredients after dry blending and, optionally, grinding at a temperature of from 85°-150° C., preferably from 90°-100° C. onto a cold belt. 1,3-Diphenoxy-2-propanol, the subject of the instant invention, can also act as a flow control agent in addition to being a good heat stabilizer, which increases its value to the polymer processor.

The following example illustrates the invention, but it should be understood that the specific example is presented by way of illustration and not by way of limitation.

EXAMPLE 1

A hot melt coating formulation was prepared by dry blending the following ingredients:

| Formulation: | Parts by Weight | | |
|---|---|---|---|
| | #1 | #2 | #3 |
| Bisphenol A Epoxy Resin[1] | 11.25 | 11.25 | 11.25 |
| Novolac modified Epoxy Resin[2] | 3.75 | 3.75 | 3.75 |
| Phenolic curing agent[3] | 5.78 | 5.78 | 5.78 |
| 1,3-Diphenoxy-2-propanol[4] | — | 0.15 | — |
| Irganox 1010 (Control)[5] | — | — | 0.15 |

[1] D.E.R. 662UH Epoxy resin, offered by Dow Chemical Corp., Midland, MI, (CAS No. 25036-25-3).
[2] D.E.R. 642UH, Novolac modified epoxy resin, offered by Dow Chemical Corp., Midland, MI (CAS No. 28064-14-4).
[3] D.E.H. 84, Epoxy Curing Agent, offered by Dow Chemical Corp., Midland, MI, a mixture of: a reaction product of epoxy resin and bisphenol A (CAS No 25036-25-3) 69%; bisphenol A (CAS No. 80-05-7) 29%, and 2-methylimidazole (CAS No. 693-98-1) 2%.
[4] Commercial grade of 1,3-diphenoxy-2-propanol, offered by GCA Chemical Corp. Stamford, CT under the name GCA #44-44, (CAS No. 622-04-8).
[5] Commercial heat stabilizer, (CAS No. 6683-19-8), offered by Ciba-Geigy Corp. Ardsley, NY.

Each solid formulation was then finely ground with a laboratory mill (Tecmar A-10). After grinding, a 4 gram aliquot of each formulation was weighed into an aluminum dish (2 inches diameter), after which the three aluminum dishes were placed on a hot plate whose surface temperature was 325° F., until the mixture in each dish was melted (about 1 minute). After cooling the contents of the dishes to room temperature, the color of the hard, solid film in each aluminum dish was compared. The results were as follows:
Formulation #1: dark brown
Formulation #2: very slightly off white
Formulation #3: White A comparison of the results shows that the formulation containing the composition of the instant invention, 1,3-diphenoxy-2-propanol (#2), was almost as efficient as a heat stabilizer as the much more expensive commercial stabilizer of formulation #3. Formulation #1, the control without any heat stabilizer failed completely. These results show that 1,3-diphenoxy-2-propanol is a valuable, low cost addition to the polymer heat stabilizer inventory.

That which is claimed is:

1. A polymeric composition, which is exposed to heat, consisting essentially of 100 parts of a polymer, containing blended therein as a heat stabilizer and antioxidant from 0.1-5 parts, based on the weight of said polymer, the compound 1,3-diphenoxy-2-propanol;

said polymeric composition optionally also containing from 0 to 55 parts, based on the weight of said polymer, of at least one of filter, dye, pigments plasticizer flow control or caring agent.

2. The polymeric composition of claim 1 wherein the amount of said 1,3-diphenoxy-2-propanol is from 0.4-4 parts, based on the weight of said polymer.

3. The polymeric composition of claim 1 wherein said polymer is an epoxy resin.

4. The polymeric composition of claim 1 wherein said polymer is a polyester resin.

5. A method to stabilize a polymeric composition against discoloration comprising the step of adding 0.1-5 parts, based on the weight of said polymeric composition, of 1,3-diphenoxy-2-propanol as a heat stabilizer and antioxidant.

6. The method to stabilize a polymeric composition against discoloration of claim 5, wherein said polymeric composition contains an epoxy resin.

7. The method to stabilize a polymeric composition against discoloration of claim 5, wherein said polymeric composition also contains a polyester resin.

8. The method to stabilize a polymeric composition against discoloration of claim 5, wherein said polymeric composition also contains from 0 to 55 parts, based on the weight of said polymeric composition, of at least one of filler, dye, pigments plasticizer flow control or caring agent.

* * * * *